United States Patent [19]

Crawford

[11] Patent Number: 4,917,552

[45] Date of Patent: Apr. 17, 1990

[54] PIN DRIVE ANCHOR WITH LOCKING SLEEVE

[75] Inventor: Danny E. Crawford, Charles City, Iowa

[73] Assignee: Diversified Fastening Systems, Inc., Charles City, Iowa

[21] Appl. No.: 402,646

[22] Filed: Sep. 5, 1989

[51] Int. Cl.$^4$ .............................................. F16B 13/06
[52] U.S. Cl. ...................................... 411/32; 411/60; 411/71
[58] Field of Search ........................ 411/32, 41, 54, 55, 411/60, 61, 71, 72, 73

[56] References Cited

U.S. PATENT DOCUMENTS

| 4,100,834 | 7/1978 | Harris | 411/55 X |
| 4,182,218 | 1/1980 | Combette et al. | 411/71 X |
| 4,678,383 | 7/1987 | Bergner | 411/55 X |
| 4,826,373 | 5/1989 | Nakano | 411/60 X |

Primary Examiner—Rodney M. Lindsey
Assistant Examiner—Jerry Redman
Attorney, Agent, or Firm—G. Brian Pingel

[57] ABSTRACT

An improved pin drive anchor has an elongated body with an inner end with a reduced section about which a locking sleeve member is secured, and a longitudinal bore extending the length of the body and having a reduced diameter section proximate to the sleeve member. The sleeve member and the body inner end are slotted to permit expansion of the sleeve member and the inner end when a pin is driven through the entire length of the body bore to firmly secure the anchor in the cavity of a wall.

6 Claims, 1 Drawing Sheet

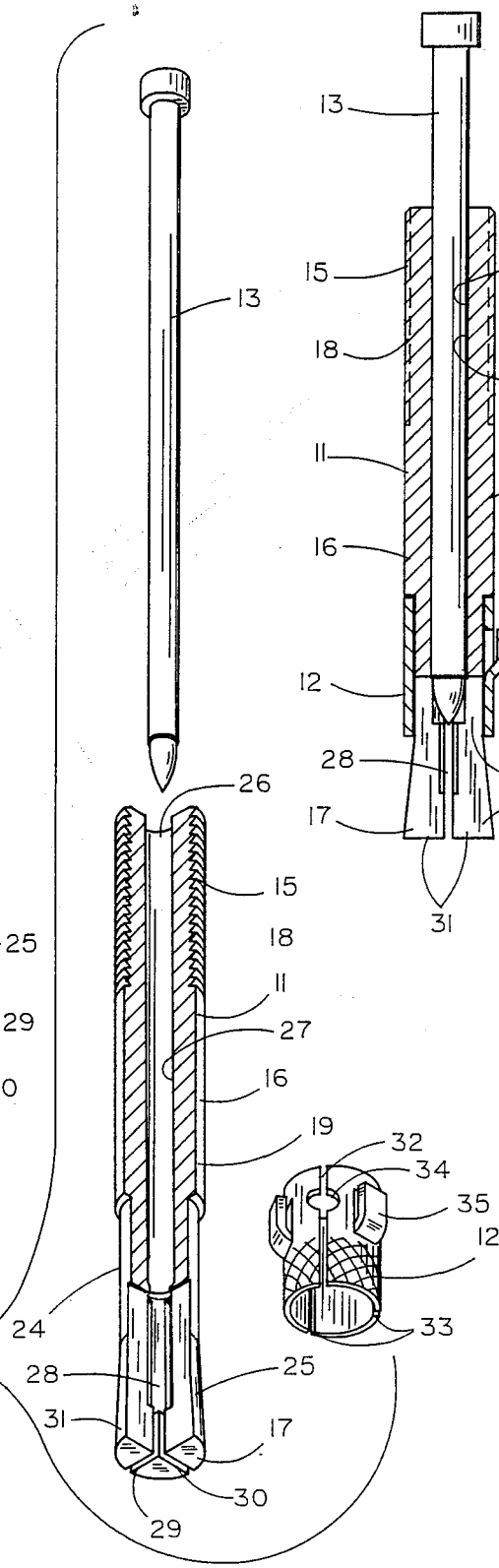

PIN DRIVE ANCHOR WITH LOCKING SLEEVE

BACKGROUND OF THE INVENTION

1. Field of the Invention

The present invention relates in general to pin drive anchors for securing various types of articles to masonry or concrete walls, and more specifically relates to an improved construction for such anchors to increase the pull-out strength thereof.

2. Description of the Prior Art

Pin drive anchors have been known in the art for many years and various types of pin drive anchor constructions are available on the open market. The most common type of pin drive anchor construction currently in use includes a body that is generally of a uniform cross-section and has a longitudinally aligned bore that is reduced in diameter near the inner end of the body. The reduced bore merges with slots in the body inner end to permit expansion of such inner end when a pin is driven through the entire length of the bore.

Although the above common pin construction has proven to be commercially successful, the pull-out value of such construction is less than desired for various pin anchor applications. Accordingly, the present invention is adapted to provide an improved pin drive anchor that is constructed to provide a pull-out value over twice as great as that of prior pin drive anchor designs.

SUMMARY OF THE INVENTION

The present invention provides an improved pin drive anchor for securing various types of articles to a masonry or concrete wall. The anchor construction of the present invention includes an elongated body having an axial bore and a reduced inner end section on which is secured a locking sleeve member. The sleeve member and the inner end body portion are slotted to permit expansion thereof when a pin is driven through the entire length of the bore.

The anchor body also includes an outer end portion and a center portion that are both generally cylindrically. Further, the outer end portion has threads for attaching articles to said wall. Preferably, the sleeve member is rotatably secured on the reduced section of the inner end body portion and the sleeve member contains spaced apart knuckles on its exterior surface for engaging and firmly securing the anchor in the wall.

BRIEF DESCRIPTION OF THE DRAWINGS

FIG. 1 is a side perspective view of a preferred embodiment of an improved pin drive anchor of the present invention shown together with a mating pin utilized for securing the anchor in a masonry or concrete wall;

FIG. 2 is an exploded side perspective view of the anchor and pin of FIG. 1 with a quarter section of the anchor removed to expose interior construction;

FIG. 3 is a cross-section view taken along the line 3—3 of FIG. 1;

FIG. 4 is a top end view of the anchor and pin shown in FIG. 1;

FIG. 5 is a side view in elevation of the anchor and pin shown in FIG. 1; and

FIG. 6 is a bottom end view of the anchor shown in FIG. 1.

DETAILED DESCRIPTION OF THE PREFERRED EMBODIMENT

Referring first to FIG. 1, the present invention provides an improved pin drive metal anchor for securing various types of articles to a masonry or concrete wall (the term "wall" is used herein to refer to any type of masonry or concrete structure). A preferred embodiment of the anchor of the invention is shown generally at 10 and is formed of an elongated body 11 and a locking sleeve member 12 that encircles a bottom or inner portion of the body 11 and is rotatably secured thereon. The anchor 10 is shown in conjunction with a pin 13 that is employed for installing the anchor 10 in the wall. As is well known in the art, the anchor 10 is utilized by inserting it into a predrilled cavity of preferably a masonry or concrete wall and then the anchor is secured in the cavity as will be described below. The elongated body 11 has three distinct portions along its length, but is integrally formed. With reference now to FIGS. 1-4, the body 11 includes a top or outer axial portion 15, a center portion 16 and a bottom or inner portion 17 (the terms "outer" and "inner" are used herein with respect to the position of the portions 15 and 17 when installed in a wall).

The diameters of the outer and center portions 15 and 16 respectively, are generally the same, but the exterior of the outer portion 15 has threads 18 whereas the center portion periphery 19 is smooth. As best shown in FIGS. 2 and 3, the inner end portion 17 is approximately equally divided into a reduced axial section 24 extending from the termination of the center portion 16 and an inclined section 25 that extends from the reduced section 24 to the terminus of the inner end portion 17.

The body 11 also includes a longitudinal axially aligned bore 26 formed of a first section 27 and a second reduced section 28. The section 27 is generally uniformly sized and extends from the terminus of the outer end portion 15 to a point approximate the beginning of the inclined section 25. The second section 28 has a diameter substantially smaller than that of the section 27. The section 28 extends inwardly toward the terminus of the body bottom portion 17 to merge with bisecting slots 29 and 30 cut laterally along the body inclined section 25. The slots 29 and 30 divide the inclined body section 25 into four downwardly depending finger type portions 31.

As best shown in FIG. 2, the sleeve 12 is tubular in shape and has an axial cut 32 along its entire length. There are also two other axial cuts 33 in the sleeve 12 that are equally spaced about the circumference of the sleeve 12 at intervals of 120° from the cut 32. However, the cuts 33 are only partial cuts, as indicated in FIG. 5, and extend from the bottom of the sleeve 12 to a point approximately medial thereof and merge with holes 34. There are three of the holes 34 in the sleeve 12 as the cut 32 also is in line with one of the holes 34. The sleeve 12 also has three knuckles 35 located on its periphery, with each knuckle 35 centered between two of the holes 34 so as to be equally spaced about the sleeve periphery.

To secure the anchor 10 in the predrilled cavity of a wall, first the anchor 10 is placed into the cavity with the inner end 17 of the body 11 adjacent the innermost portion of the cavity. The pin 13 is then placed into the bore 26 to lie approximately in the position depicted in FIG. 3. The head of the pin 13 is then struck with preferably a hammer to drive the pin into the reduced bore section 28 and the slots 30 and 31 to spread apart the fingers 31 on the body inner end 17. Simultaneously, the sleeve 12 also is forced into a spread apart condition, with the knuckles 35 engaging the sidewalls of the wall cavity to firmly secure the anchor 10 therein.

Thus, the present invention provides a new and improved pin drive anchor 10 for securing various types of articles to masonry or concrete walls. By the use of the locking sleeve 12 having knuckles 35 that essentially become wedged in the cavity in which the anchor is secured, the pullout value of the present invention is substantially greater than that for prior art devices. In fact, it is believed that the present invention has a pullout value greater than twice that of normal pin drive anchors.

Although a specific preferred embodiment has been shown and described herein, it should be noted by those skilled in the art that modifications and variations can be made to such embodiment without departing from the true spirit and scope of the present invention.

I claim:

1. An improved pin drive anchor for securing various types of articles to a masonry or concrete wall, said anchor comprising:
   (a) an elongated body having:
      (1) an outer generally cylindrical end portion having threads for attaching said articles to said wall;
      (2) a generally cylindrical center portion;
      (3) an inner generally cylindrical end portion that is approximately equally divided into a reduced section extending from said center portion and an inclined section that extends from said reduced portion to the free terminus of said inner end portion; and
      (4) a longitudinal axially aligned bore that includes a first section with a generally uniform diameter extending from the free terminus of said outer end portion to a point proximate with said inclined section and a second section that has a diameter smaller than that of said first section and extends inwardly from said first section;
   (b) a sleeve member secured on said reduced section of said inner end body portion;
   (c) said sleeve member and said body inner end portion being slotted to permit expansion of said sleeve member and said inner end portion of said body when a pin is driven through the entire length of said bore.

2. An improved pin drive anchor for securing various types of articles to a masonry or concrete wall, said anchor comprising:
   (a) an elongated body having:
      (1) an outer generally cylindrical end portion that forms a major portion of said body and has means for attaching said articles to said wall;
      (2) an inner generally cylindrical opposite end portion that is approximately equally divided into a reduced section extending from said outer end portion and an inclined section that extends from said reduced section to the free terminus of said inner end portion; and
      (3) a longitudinal axially aligned bore that includes a first section with a generally uniform diameter extending from the free terminus of said outer end portion to a point proximate to said inclined portion of said inner end portion and a second section that has a diameter smaller than that of said first section and extends inwardly from said first section;
   (b) a sleeve member secured on said reduced section of said inner end portion;
   (c) said sleeve member and said body inner end portion being slotted to permit expansion of said sleeve member and said inner end portion of said body when a pin is driven through the entire length of said bore.

3. An improved pin drive anchor for securing various types of articles to a masonry or concrete wall, said anchor comprising:
   (a) an elongated body having an inner generally cylindrically end portion approximately equally divided into an inclined section that extends from the free terminus of said inner end portion to approximately a midpoint of said portion and a reduced section extending from said midpoint the remainder of said portion;
   (b) a longitudinal axially aligned bore that includes a first section with a uniform diameter extending from the free terminus of an outer end portion of said body to a point proximate with said inclined section, and a second section that has a diameter smaller than that of said first section and extends inwardly from said first section;
   (c) a sleeve member secured on said reduced section of said inner end body portion; and
   (d) said sleeve member and said body inner end portion being slotted to permit expansion of said sleeve member and said inner end portion when a pin is driven through the entire length of said bore.

4. An anchor as recited in claim 3 wherein said sleeve member has at least one wall engaging member on its periphery.

5. An anchor as recited in claim 4 wherein said sleeve has a plurality of wall engaging members.

6. An anchor as recited in claim 5 wherein said sleeve is rotatably secured on said body.

* * * * *